(12) United States Patent
Bouchon et al.

(10) Patent No.: US 8,474,429 B2
(45) Date of Patent: Jul. 2, 2013

(54) METHOD AND APPARATUS FOR STARTING AN INTERNAL COMBUSTION ENGINE

(75) Inventors: Nicolas Bouchon, Vancouver (CA); Martin Strange, Vancouver (CA)

(73) Assignee: Mosaid Technologies Inc., Ottawa (CA)

( * ) Notice: Subject to any disclaimer, the term of this patent is extended or adjusted under 35 U.S.C. 154(b) by 481 days.

(21) Appl. No.: 12/735,049

(22) PCT Filed: Dec. 11, 2007

(86) PCT No.: PCT/CA2007/002354
§ 371 (c)(1),
(2), (4) Date: Jun. 11, 2010

(87) PCT Pub. No.: WO2009/073951
PCT Pub. Date: Jun. 18, 2009

(65) Prior Publication Data
US 2010/0251984 A1    Oct. 7, 2010

(51) Int. Cl.
*F01L 13/08* (2006.01)
*F02N 11/08* (2006.01)
(52) U.S. Cl.
USPC .................................. 123/179.3; 123/182.1
(58) Field of Classification Search
USPC .. 123/179.3, 179.28, 182.1, 179.25; 701/113; 180/65.2
See application file for complete search history.

(56) References Cited

U.S. PATENT DOCUMENTS

| | | | |
|---|---|---|---|
| 5,713,814 A | 2/1998 | Hara et al. | |
| 5,789,881 A | 8/1998 | Egami et al. | |
| 5,873,426 A | 2/1999 | Tabata et al. | |
| 5,903,061 A | 5/1999 | Tsuzuki et al. | |
| 6,077,186 A | 6/2000 | Kojima et al. | |
| 6,244,368 B1 | 6/2001 | Ando et al. | |
| 6,453,863 B1 * | 9/2002 | Pels et al. ................ | 123/179.3 |
| 6,629,026 B1 | 9/2003 | Baraszu et al. | |
| 6,634,986 B2 | 10/2003 | Kima | |

(Continued)

FOREIGN PATENT DOCUMENTS

| | | |
|---|---|---|
| EP | 0729858 B1 | 9/1996 |
| EP | 0922600 A2 | 6/1999 |

(Continued)

OTHER PUBLICATIONS

International Search Report and Written Opinion, International Application No. PCT/CA2007/002354, dated Sep. 4, 2008, 9 pages (unnumbered).

*Primary Examiner* — Mahmoud Gimie
(74) *Attorney, Agent, or Firm* — Iandiorio Teska & Coleman, LLP

(57) ABSTRACT

A method and apparatus for starting an internal combustion engine is disclosed. A motor is mechanically coupled to the engine, the engine having at least one moveable element mounted in a chamber, the moveable element being operable to cause a changing compression condition within the chamber and being mechanically coupled to a shaft for generating mechanical power. The method involves causing the motor to supply a positioning torque to the engine to move the at least one moveable element into a starting position, The method also involves causing the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine.

35 Claims, 9 Drawing Sheets

U.S. PATENT DOCUMENTS

| | | |
|---|---|---|
| 6,994,177 B2 | 2/2006 | Ito et al. |
| 7,165,638 B2 | 1/2007 | Ito et al. |
| 7,191,746 B2 | 3/2007 | Nakamura et al. |
| 7,347,803 B2 | 3/2008 | Kobayashi et al. |
| 7,469,758 B2 | 12/2008 | Iwanaka et al. |
| 7,766,107 B2 | 8/2010 | Joe et al. |
| 7,874,956 B2 | 1/2011 | Kouno |
| 2001/0044683 A1 | 11/2001 | Takaoka et al. |
| 2002/0117860 A1 | 8/2002 | Man et al. |
| 2003/0000751 A1 | 1/2003 | Denton et al. |
| 2003/0173783 A1 | 9/2003 | Berels |
| 2005/0211479 A1 | 9/2005 | Tamor |
| 2007/0056783 A1 | 3/2007 | Joe et al. |
| 2007/0101965 A1 | 5/2007 | Asahara et al. |
| 2007/0275818 A1 | 11/2007 | Kouno |

FOREIGN PATENT DOCUMENTS

| | | |
|---|---|---|
| EP | 1193101 A1 | 4/2002 |
| JP | 2000-220732 A | 8/2000 |
| WO | WO 2006/029878 A1 | 9/2005 |

* cited by examiner

METHOD AND APPARATUS FOR STARTING AN INTERNAL COMBUSTION ENGINE

BACKGROUND OF THE INVENTION

1. Field of Invention

This invention relates generally to internal combustion engines and more particularly to starting an internal combustion engine.

2. Description of Related Art

In general, internal combustion engines are started by applying an external starting torque to cause the engine to run up to a speed at which sustained combustion of a fuel mixture occurs, thus causing the engine to produce a drive torque. The external starting torque is commonly provided by an electric starter motor, which is mechanically coupled to the engine during starting.

Starter motors are generally configured to turn the engine from a standstill up to a low rotational speed for starting (for example 200 rpm). The starter motor must therefore be sized to provide sufficient torque to turn the engine from a state of rest to overcome peak cylinder compression.

When an engine is stopped it is likely that the engine will come to a standstill when the momentum of the pistons and other moving elements is insufficient to overcome the cylinder compression. Under these conditions it is likely that the engine will be at a point in the engine cycle close to a compression stroke, and thus the starter motor must overcome the peak cylinder compression with little opportunity to build up momentum. Accordingly a worst case starting torque must be taken into account when selecting a starter motor.

Particularly in hybrid vehicles that employ start/stop operation, an engine may be started many times during a single trip. Furthermore, in hybrid vehicles where the starter motor also functions as a generator and/or drive motor, the requirement to overcome a worst case starting torque may result in selection of a motor that does not operate optimally as a generator and/or drive motor.

SUMMARY OF THE INVENTION

It has been recognized by the inventors that when sizing a motor for starting an internal combustion engine, accounting for worst case conditions generally results in over-specifying the torque capacity of the motor. Accordingly, in one aspect of the invention there is provided a method for starting an internal combustion engine having a motor mechanically coupled to the engine, the engine having at least one moveable element mounted in a chamber, the moveable element being operable to cause a changing compression condition within the chamber and being mechanically coupled to a shaft for generating mechanical power. The method involves causing the motor to supply a positioning torque to the engine to move the at least one moveable element into a starting position. The method also involves causing the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine.

Causing the motor to supply the positioning torque to move the at least one moveable element into the starting position may involve causing the motor to supply a reference positioning torque to the engine in an opposite direction to the starting torque, the reference positioning torque having a magnitude sufficient to cause the at least one moveable element to move to a position at which a force exerted on the moveable element by the reference torque matches a force exerted on the moveable element due to the compression condition in the chamber.

Causing the motor to supply the reference positioning torque may involve calculating the magnitude of the reference positioning torque in response to receiving a temperature signal representing an operating temperature of the engine.

Causing the motor to supply the positioning torque to move the at least one moveable element into the starting position may involve causing the motor to supply torque to the engine to cause the moveable element to move in a direction opposite to a direction required to start the engine, and causing the motor to discontinue supplying torque to the engine when the moveable element reaches the starting position.

Causing the motor to supply torque to the engine may involve causing the moveable element to move at a reference speed.

Causing the motor to discontinue supplying torque to the engine when the moveable element reaches the starting position may involve receiving a signal representing one of a magnitude of the torque supplied by the motor to maintain the reference speed, and a position of the at least one moveable element in the chamber, and causing the motor to discontinue supplying torque to the engine when the signal meets a criterion.

Causing the motor to supply torque to the engine may involve causing the motor to supply a reference torque to the engine.

Causing the motor to discontinue supplying torque to the engine when the moveable element reaches the starting position may involve receiving a signal representing one of a position of the at least one moveable element in the chamber, and a speed of the moveable element, and causing the motor to discontinue supplying torque to the engine when the signal meets a criterion.

The at least one moveable element may include a piston received in a cylindrical chamber for reciprocating linear motion therein, the piston being mechanically coupled to a crankshaft for converting the reciprocating linear motion into rotary motion of the crankshaft and the method may further involve mechanically coupling the motor to the crankshaft to supply the positioning torque and the starting torque to the piston.

The at least one moveable element may include a plurality of pistons, each being received in a respective cylindrical chamber and coupled to a crankshaft such that, in operation, at least two of the plurality of pistons have peak compression conditions that occur spaced apart in time, and causing the motor to supply the positioning torque to the engine may involve supplying a torque to the crankshaft to cause the plurality of pistons to move to one of at least two starting positions having a low compression condition.

Causing the motor to supply the positioning torque may involve causing the motor to supply a positioning torque to the engine in response to receiving an engine control signal having a signal state indicating that the engine has been stopped.

The method may involve coupling the mechanical power produced by the engine to at least one drive wheel of a vehicle, and producing the engine control signal in response to receiving a vehicle operating condition signal representing at least one operating condition of the vehicle.

Causing the motor to supply the positioning torque may involve producing a motor control signal operable to cause an electrical current to be coupled to the motor to produce the positioning torque.

The method may involve causing the motor to be configured in a generator mode once the engine has been started, the motor being operable to produce electrical energy in response to receiving a torque from the engine when configured in the generator mode.

At least a portion of the electrical energy produced by the motor in the generator mode may be stored in the energy storage element.

The engine may be used in a vehicle, the vehicle may further involve an energy storage element and a traction motor, the traction motor being operably configured to receive electrical energy from an energy storage element and to convert the electrical energy into a drive torque for driving the vehicle.

The method may involve coupling the mechanical power produced by the engine to at least one drive wheel of a vehicle.

The method may involve causing the motor to supply a drive torque for driving the vehicle.

The method may involve decoupling the motor from the engine after the engine has been started.

Causing the motor to supply a positioning torque to the engine may involve mechanically coupling the motor to the engine when the engine is stopped.

In accordance with another aspect of the invention there is provided an apparatus for starting an internal combustion engine. The apparatus includes a motor mechanically coupled to the engine, the engine having at least one moveable element mounted in a chamber, the moveable element being operable to cause a changing compression condition within the chamber and being mechanically coupled to a shaft for generating mechanical power. The apparatus also includes a controller. The controller is operably configured to cause the motor to supply a positioning torque to the engine to move the at least one moveable element into a starting position. The controller is also operably configured to cause the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine.

The controller may be operably configured to cause the motor to supply a reference positioning torque to the engine in an opposite direction to the starting torque, the reference positioning torque having a magnitude sufficient to cause the at least one moveable element to move to a position at which a force exerted on the moveable element by the reference torque matches a force exerted on the moveable element due to the compression condition in the chamber.

The controller may be operably configured to calculate the magnitude of the reference positioning torque in response to receiving a temperature signal representing an operating temperature of the engine.

The controller may be operably configured to cause the motor to supply torque to the engine to cause the moveable element to move in a direction opposite to a direction required to start the engine, and to cause the motor to discontinue supplying torque to the engine when the moveable element reaches the starting position.

The controller may be operably configured to cause the moveable element to move at a reference speed.

The controller may be operably configured to receive a signal representing one of a magnitude of the torque supplied by the motor to maintain the reference speed, and a position of the at least one moveable element in the chamber, and to cause the motor to discontinue supplying torque to the engine when the signal meets a criterion.

The controller may be operably configured to cause the motor to supply a reference torque to the engine.

The controller may be operably configured to receive a signal representing one of a position of the at least one moveable element in the chamber, and a speed of the moveable element, and to cause the motor to discontinue supplying torque to the engine when the signal meets a criterion.

The at least one moveable element may include a piston received in a cylindrical chamber for reciprocating linear motion therein, the piston being mechanically coupled to a crankshaft for converting the reciprocating linear motion into rotary motion of the crankshaft and the motor may be operably configured to be coupled to the crankshaft to supply the positioning torque and the starting torque to the piston.

The at least one moveable element may include a plurality of pistons, each being received in a respective cylindrical chamber and coupled to a crankshaft such that, in operation, at least two of the plurality of pistons have peak compression conditions that occur spaced apart in time, and the controller may be operably configured to cause the motor to supply the positioning torque to the engine by supplying a torque to the crankshaft to cause the plurality of pistons to move to one of at least two starting positions having a low compression condition.

The controller may be operably configured to cause the motor to supply the positioning torque to the engine in response to receiving an engine control signal having a signal state indicating that the engine has been stopped.

The engine may be used in a vehicle and the controller may be operably configured to produce the engine control signal in response to receiving a vehicle operating condition signal representing at least one operating condition of the vehicle.

The engine may be operably configured to couple the mechanical power produced by the engine to at least one drive wheel of a vehicle and the controller may be operably configured to produce a motor control signal operable to cause an electrical current to be coupled to the motor to produce the positioning torque.

The motor may be operable to be configured in a generator mode once the engine has been started, the motor being operable to produce electrical energy in response to receiving a torque from the engine when configured in the generator mode.

The energy storage element may be operably configured to store at least a portion of the electrical energy produced by the motor in the generator mode.

The vehicle may further include an energy storage element and a traction motor, the traction motor being operably configured to receive electrical energy from an energy storage element and to convert the electrical energy into a drive torque for driving the vehicle.

The engine may be operably configured to couple the mechanical power produced by the engine to at least one drive wheel of a vehicle and the controller may be operably configured to cause the motor to supply a drive torque for driving the vehicle.

The engine may be operably configured to couple the mechanical power produced by the engine to at least one drive wheel of a vehicle.

The motor may be operably configured to decouple from the engine after the engine has been started.

The motor may be operably configured supply a positioning torque to the engine by mechanically coupling the motor to the engine when the engine is stopped.

The controller may include a processor circuit.

In accordance with another aspect of the invention there is provided an apparatus for starting an internal combustion engine having a motor mechanically coupled to the engine, the engine having at least one moveable element mounted in a chamber, the moveable element being operable to cause a changing compression condition within the chamber and being mechanically coupled to a shaft for generating mechanical power. The apparatus includes provisions for causing the motor to supply a positioning torque to the engine to move the at least one moveable element into a starting position, and provisions for causing the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine.

The provisions for causing the motor to supply the positioning torque to move the at least one moveable element into the starting position may include provisions for causing the motor to supply a reference positioning torque to the engine in an opposite direction to the starting torque, the reference positioning torque having a magnitude sufficient to cause the at least one moveable element to move to a position at which a force exerted on the moveable element by the reference torque matches a force exerted on the moveable element due to the compression condition in the chamber.

The provisions for causing the motor to supply the reference positioning torque may include provisions for calculating the magnitude of the reference positioning torque in response to receiving a temperature signal representing an operating temperature of the engine.

The provisions for causing the motor to supply the positioning torque to move the at least one moveable element into the starting position may include provisions for causing the motor to supply torque to the engine to cause the moveable element to move in a direction opposite to a direction required to start the engine, and provisions for causing the motor to discontinue supplying torque to the engine when the moveable element reaches the starting position.

The provisions for causing the motor to supply torque to the engine may include provisions for causing the moveable element to move at a reference speed.

The provisions for causing the motor to discontinue supplying torque to the engine when the moveable element reaches the starting position may include provisions for receiving a signal representing one of a magnitude of the torque supplied by the motor to maintain the reference speed, and a position of the at least one moveable element in the chamber, and provisions for causing the motor to discontinue supplying torque to the engine when the signal meets a criterion.

The provisions for causing the motor to supply torque to the engine may include provisions for causing the motor to supply a reference torque to the engine.

The provisions for causing the motor to discontinue supplying torque to the engine when the moveable element reaches the starting position may include provisions for receiving a signal representing one of a position of the at least one moveable element in the chamber, and a speed of the moveable element, and provisions for causing the motor to discontinue supplying torque to the engine when the signal meets a criterion.

The at least one moveable element may include a piston received in a cylindrical chamber for reciprocating linear motion therein, the piston being mechanically coupled to a crankshaft for converting the reciprocating linear motion into rotary motion of the crankshaft and the apparatus may include provisions for mechanically coupling the motor to the crankshaft to supply the positioning torque and the starting torque to the piston.

The at least one moveable element may include a plurality of pistons, each being received in a respective cylindrical chamber and coupled to a crankshaft such that, in operation, at least two of the plurality of pistons have peak compression conditions that occur spaced apart in time, and the provisions for causing the motor to supply the positioning torque to the engine may include provisions for supplying a torque to the crankshaft to cause the plurality of pistons to move to one of at least two starting positions having a low compression condition.

The provisions for causing the motor to supply the positioning torque may include provisions for causing the motor to supply a positioning torque to the engine in response to receiving an engine control signal having a signal state indicating that the engine has been stopped.

The apparatus may include provisions for coupling the mechanical power produced by the engine to at least one drive wheel of a vehicle, and provisions for producing the engine control signal in response to receiving a vehicle operating condition signal representing at least one operating condition of the vehicle.

The provisions for causing the motor to supply the positioning torque may include provisions for producing a motor control signal operable to cause an electrical current to be coupled to the motor to produce the positioning torque.

The apparatus may include provisions for causing the motor to be configured in a generator mode once the engine has been started, the motor being operable to produce electrical energy in response to receiving a torque from the engine when configured in the generator mode.

The provisions for storing energy may be operably configured to store the electrical energy produced by the motor in the generator mode.

The engine may be used in a vehicle, the vehicle may further include provisions for storing energy and a traction motor, the traction motor being operably configured to receive electrical energy from the provisions for storing energy and to convert the electrical energy into a drive torque for driving the vehicle.

The apparatus may include provisions for coupling the mechanical power produced by the engine to at least one drive wheel of a vehicle.

The apparatus may include provisions for causing the motor to supply a drive torque for driving the vehicle.

The apparatus may include provisions for decoupling the motor from the engine after the engine has been started.

The provisions for causing the motor to supply a positioning torque to the engine may include provisions for mechanically coupling the motor to the engine when the engine may be stopped.

In accordance with another aspect of the invention there is provided a computer readable medium encoded with codes for directing a processor circuit to start an internal combustion engine, the internal combustion engine having a motor mechanically coupled to the engine, the engine having at least one moveable element mounted in a chamber, the moveable element being operable to cause a changing compression condition within the chamber and being mechanically coupled to a shaft for generating mechanical power. The codes direct the processor circuit to cause the motor to supply a positioning torque to the engine to move the at least one moveable element into a starting position. The codes also direct the processor circuit to cause the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine.

In accordance with another aspect of the invention there is provided a computer readable signal encoded with codes for directing a processor circuit to start an internal combustion engine, the internal combustion engine having a motor mechanically coupled to the engine, the engine having at least one moveable element mounted in a chamber, the moveable element being operable to cause a changing compression condition within the chamber and being mechanically coupled to a shaft for generating mechanical power. The codes direct the processor circuit to cause the motor to supply a positioning torque to the engine to move the at least one moveable element into a starting position. The codes also direct the processor circuit to cause the motor to supply a starting torque to the engine when the at least one moveable element is in the starting position to cause the moveable element to accelerate from the starting position under low compression conditions to generate sufficient momentum to overcome a peak compression condition in the chamber, thereby reducing the starting torque required to start the engine. Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
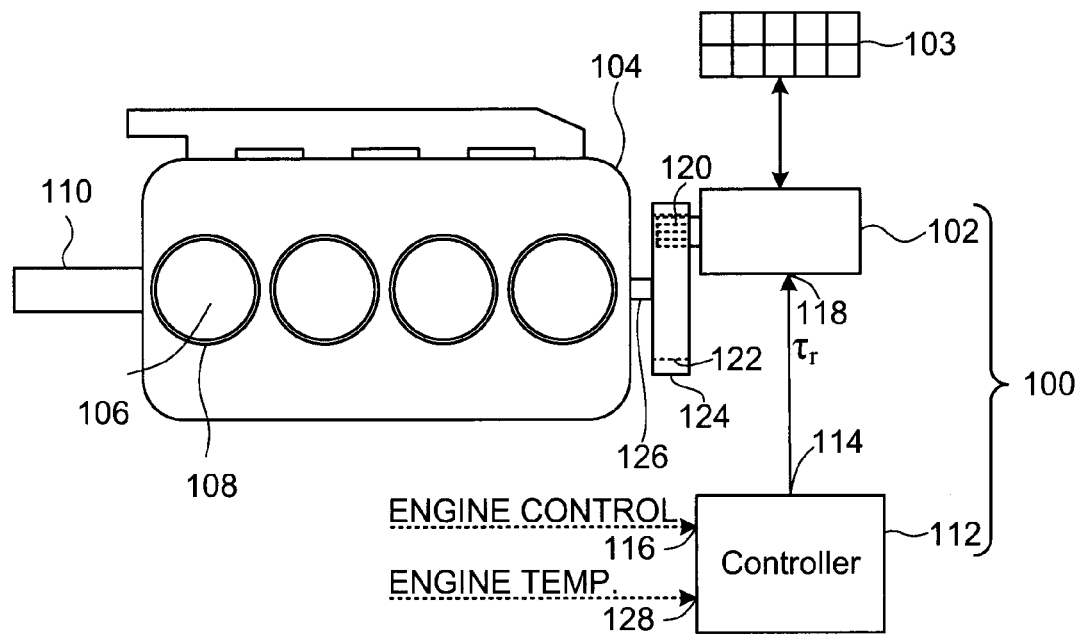
FIG. 1 is a schematic view of a first embodiment of an apparatus for starting an internal combustion engine.

Referring to FIG. 1, an apparatus for starting an internal combustion engine in accordance with a first embodiment of the invention is shown generally at 100. The apparatus 100 includes a motor 102, which is mechanically coupled to an engine 104. The engine 104 has at least one moveable element 106, which is mounted in a chamber 108. The moveable element 106 is operable to cause a changing compression condition within the chamber 108 and is mechanically coupled to a shaft 110 for generating mechanical power.

The apparatus 100 also includes a controller 112, which is operably configured to cause the motor 102 to supply a positioning torque to the engine 104 to move the at least one moveable element 106 into a starting position. The controller 112 is also operably configured to cause the motor 102 to supply a starting torque to the engine 104 when the moveable element 106 is in the starting position, to cause the moveable element to accelerate from the starting position under low compression conditions and to generate sufficient momentum to overcome a peak compression condition in the chamber 108. Advantageously, by moving the at least one moveable element 106 into a starting position, the apparatus 100 reduces the starting torque required to be supplied by the motor 102 in order to start the engine 104.

In the embodiment shown in FIG. 1, the engine includes a flywheel 124 coupled to the engine 104 by a shaft 126. The motor 102 includes a gear 120 which meshes with an internal gear surface (shown in broken line at 122) of the engine flywheel 124 for mechanically coupling torque produced by the motor to the engine 104. In other embodiments the motor 102 may be directly coupled to the engine 104, or may be coupled to the engine by a belt, chain, or any other mechanical coupling means. The shaft 110 may also be coupled to the engine on the same side as the flywheel 124.

In the embodiment shown the motor 102 is an electrical motor and the apparatus 100 further includes an energy storage element 103 for providing electrical energy to the motor. In other embodiments the motor may be a hydraulic motor or a pneumatic motor, for example.

In this embodiment, the controller 112 includes an output 114 for producing a motor control signal for controlling the motor 102 and the motor includes an input 118 for receiving the motor control signal. The motor 102 receives electrical energy from the storage element 103 and converts the electrical energy into a mechanical torque in response to the motor control signal. The motor control signal thus controls a magnitude and a direction of the positioning and starting torque. In this embodiment, the positioning torque has a lower magnitude and is in an opposite direction to the starting torque.

The storage element 103 may comprise a plurality of cells. In one embodiment, the cells in the storage element 103 may include electrochemical cells, such as nickel metal hydride (NiMH) storage cells. In other embodiments, the storage element 103 may include a combination of electrochemical cells and/or a storage capacitor element, such as an ultracapacitor (also know as a supercapacitor), for example.

In other embodiments, the motor 102 may be selectively mechanically coupled to the engine 104 when the motor control signal is received at the input 118. For example, the motor 102 may include a conventional solenoid (not shown) for connecting the starter motor to a source of electrical energy and for activating a drive pinion to engage the internal gear surface 122 of the flywheel 124.

The controller 112 also optionally includes an input 116 for receiving one or more engine control signals. The engine control signal may represent a state of the engine 104 such as whether the engine is running or stopped. Alternatively, the engine control signal may represent a torque provided on the shaft 126 to the engine or a motor position signal representing a position of the moveable element 106 or the flywheel 124, or the shaft 110, for example.

In this embodiment, the controller 112 includes an input 128 for receiving an engine temperature signal. The temperature signal may be produced by a temperature sensor that is located to sense a temperature of the chamber 108, a coolant for cooling the engine 104, an engine block, or a lubricating fluid (i.e. the engine oil), for example.

Figure 2:
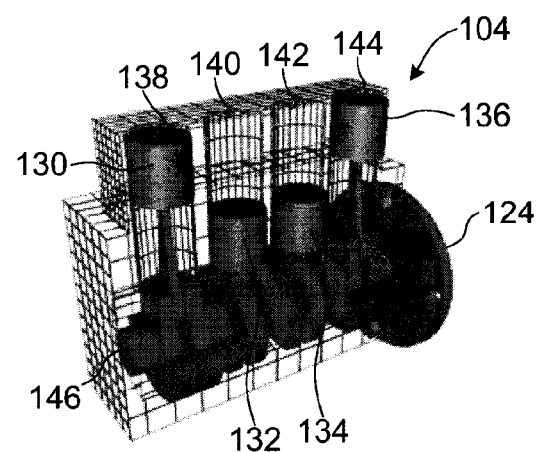
FIG. 2 is a cutaway perspective view of an engine shown in FIG. 1.

The engine 104 is shown in greater detail in FIG. 2. Referring to FIG. 2 the engine 104 includes four moveable pistons 130, 132, 134, and 136, each being received in respective cylindrical chambers 138, 140, 142, and 144 for reciprocating linear motion therein. The pistons 130-136 are each mechanically coupled to a crankshaft 146 for converting the reciprocating linear motion into rotary motion of the crankshaft. In other embodiments different piston configurations and number of pistons may be employed such as a V6 or flat configuration, for example.

In this embodiment the flywheel 124 couples motor torque to the engine and further provides an inertial mass for reducing torque pulsations due to combustion within the cylinders 138-144. The engine 104 also includes various other components (not shown in FIG. 2) for conventionally implementing a four stroke Otto cycle engine, such as intake valves, exhaust valves, and ignition components.

In other embodiments, the engine may have an alternative moveable element configuration, such as a rotary piston within an epitrochoidal chamber as is used in a Wankel engine, for example.

In a four cylinder four stroke engine such as the engine 104 shown in FIG. 2, one complete engine cycle occurs over two revolutions (720°) of the crankshaft 146 and the pistons thus move in pairs (130, 136 and 132, 134). Each pair is thus always at the same position within the respective cylinders, but is 360° out of phase within the cycle. For example the piston pair 130 and 136 shown in FIG. 2 are both near the top of their respective strokes, but only one will be on a firing stroke (i.e. ignition of a fuel mixture) while the other will be on an intake stroke (i.e. intake of the fuel mixture). Similarly for the piston pair 132 and 134, one will be in a compression stroke (compressing the fuel mixture) while the other will be on an exhaust stroke (exhausting combusted fuel products). When the engine 104 is operating, the torque required to perform the compression stroke is provided by the piston on the firing stroke (for example, for a 1, 3, 4, 2 firing order of the pistons 130-136, when piston 130 is fired, piston 134 is on a compression stroke). However, when starting the engine 104, the torque for providing compression must be supplied from an external motive force, such as from the motor 102 shown in FIG. 1.

Figure 3:
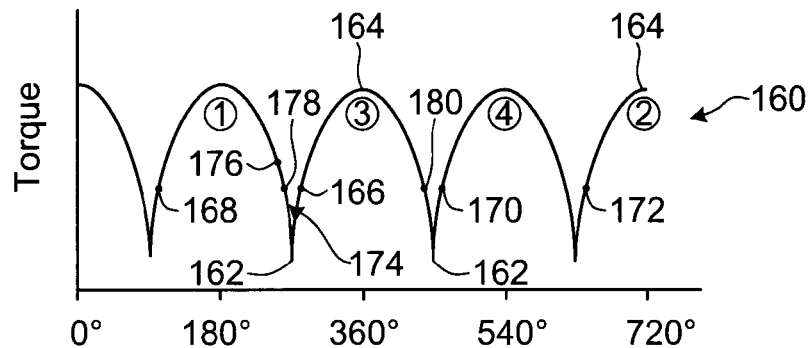
FIG. 3 is an idealized graphical depiction of torque provided by a motor shown in FIG. 1 during starting of the engine shown in FIG. 2.

Referring to FIG. 3, an idealized graphical depiction of the torque provided by the motor 102 to turn the engine 104 against compression during starting is shown generally at 160. The torque varies between a low compression condition 162, which occurs when a compression stroke is just about to commence, and a peak compression condition when a compression stroke is completed and firing is just about to occur. The graphical depiction 160 is idealized in that a moment of inertia at rest of the pistons 130-136, crankshaft 146, and flywheel 124, has not been taken into account, and the momentum of these moving elements once accelerated from rest, has also not been taken into account. Such factors would have the effect of altering the shape and/or magnitude of subsequent peaks 164 of the graphical depiction 160. The graphical depiction 160 also applies to a portion of the starting cycle before combustion of fuel in the chamber 108 provides a further torque in addition to the torque provided by the motor 102.

Figure 4:
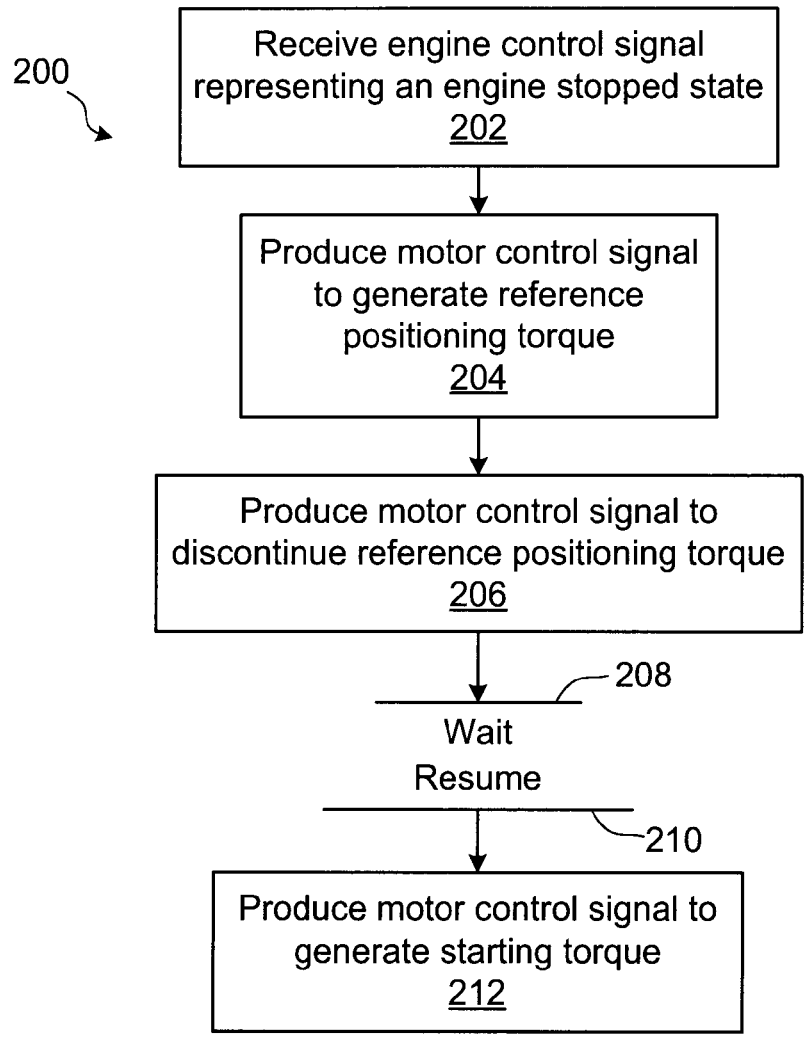
FIG. 4 is a flowchart of a process for starting the engine shown in FIG. 2.

Referring to FIG. 4, a process for starting the engine 104 shown in FIG. 1 is shown generally at 200. As shown at 202, the process begins when an engine control signal that has a state indicating that the engine 104 has stopped is received at the input 116 of the controller 112.

Referring back to FIG. 3, when stopped, the engine 104 will likely come to a standstill at one of a plurality of stop positions 166-172 where the engine momentum due to motion of the pistons 130-136, crankshaft 146, and flywheel 124 becomes insufficient to overcome compression in the cylinders 138-144. In general, the engine 104 would be equally likely to come to a standstill at one of the stop positions 166-172 shown in FIG. 3, depending on when the ignition signal is interrupted and the momentum of the moveable elements in the engine 104.

As shown at 204, the process then continues when the controller 112 produces a motor control signal at the output 114 that causes the motor 102 to supply a reference positioning torque to the engine 104. The reference positioning torque may be a fixed pre-determined torque value for the engine 104, or alternatively may be a an adaptive threshold torque value that changes in response to temperature and/or other environmental or engine conditions. Accordingly the reference positioning torque may be selected in response to the temperature signal received at the input 128 of the controller 112. For example, in embodiments where the controller 112 is implemented using a processor circuit such as described later herein, the reference positioning torque may be calculated or selected from a look-up table. The reference torque may also be varied as a function of engine rotational position, for example, such that the reference torque value changes as the moveable element approaches the starting position.

The engine 104 responds to the reference positioning torque by moving away from the stopped position (for example the stop position 166) in a direction indicated by the arrow 174 in FIG. 3. The stop position 166 is on the compression stroke of the piston 136 and thus the engine 104 moves away from the compression stroke of the piston 136 and encounters compression due to the piston 134 moving against compression of the cylinder 142. When a force exerted by the reference torque matches a force exerted on the pistons 134 due to the compression condition in the cylinder 142, the engine 104 once again comes to a standstill at a starting position 176.

As shown at 206, the process continues when the controller 112 produces a motor control signal that causes the motor 102 to discontinue producing the reference positioning torque. When the positioning torque is removed, the engine 104 may reposition to a new starting position 178 due to forces exerted on the piston 134 by the compression condition in the cylinder 142. In general, the process steps 204 and 206 cause the motor control signal to be active for a time sufficient to move the engine from the stop position 166 to the starting position 176.

Accordingly, the motor control signal may be active for some fixed time duration dependent on the type of engine.

As shown at 208, the process 200 is then suspended waiting for an engine control signal to be received at the input 116. The process 200 resumes at 210 when the engine control signal representing a request or command to start the engine 104 is received at the input 116. Alternatively, the wait state 208 and resume state 210 may be eliminated by initiating the process 200 only when an engine start command is received, at which time blocks 204, 206, and 212 may be executed in sequence.

As shown at 212, the controller 112 then produces a motor control signal to cause the motor 102 to produce a starting torque for starting the engine 104. In this embodiment the starting torque causes the engine 104 to move from the starting position 176 or 178 shown in FIG. 3 toward the stop position 166, through the compression stroke of the piston 136, and through successive subsequent compression strokes of pistons 130 to 136 until the engine is started.

In alternative embodiments, when the engine 104 stops at the stop position 166 the reference positioning torque may be applied in a direction opposite to the direction indicated by the arrow 174, which causes the piston 144 to move through the compression stroke to a starting position 180. In this alternative embodiment, the direction of the reference positioning torque and the direction of the starting torque are the same.

The engine 104 shown in FIG. 1 and FIG. 2 may be used to provide drive power for a motor vehicle, locomotive, or ship, for example. Alternatively the engine may be used to drive a generator for generating electrical energy.

Hybrid Vehicle Embodiment

Figure 5:
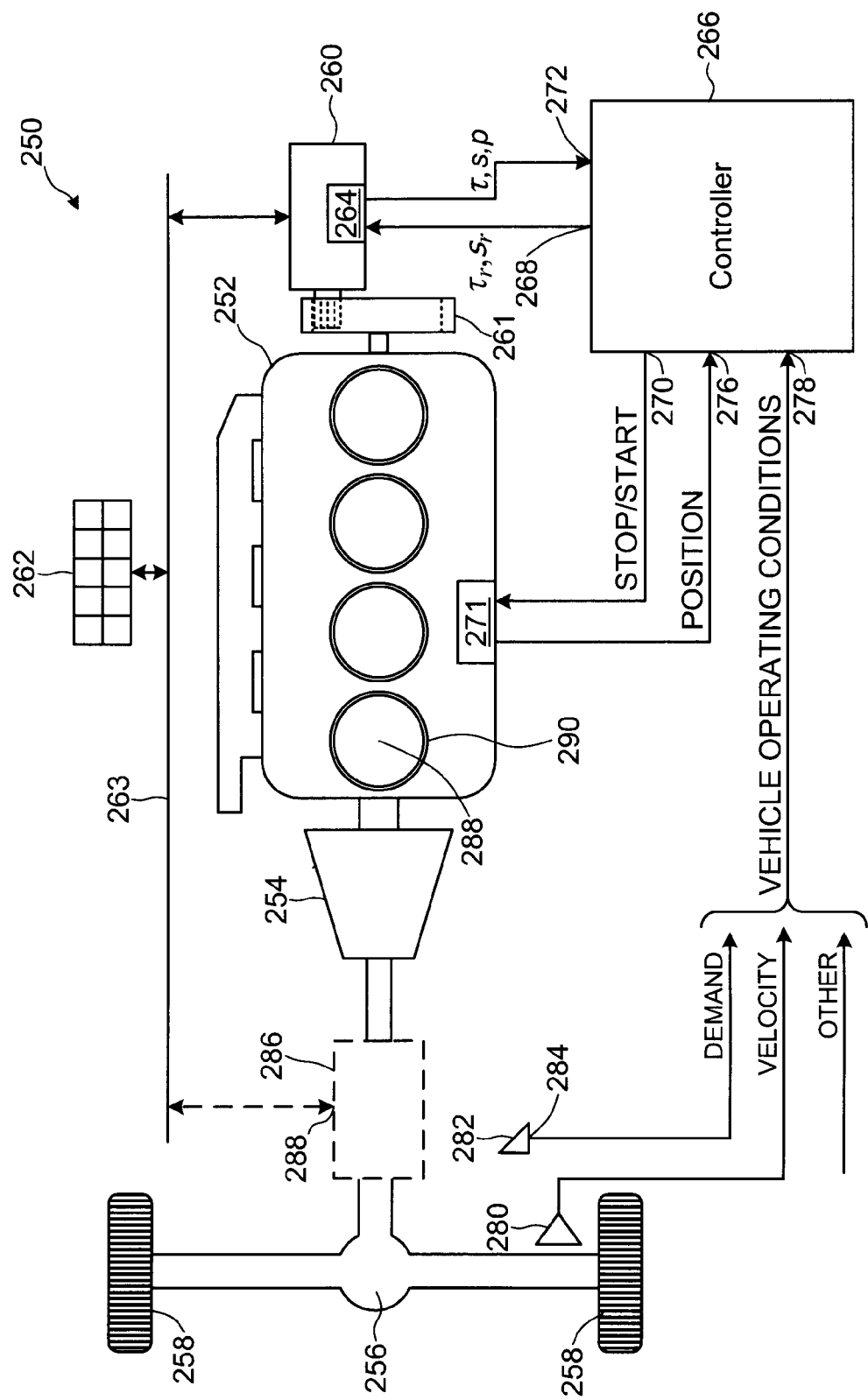
FIG. 5 is a schematic view of a hybrid vehicle embodiment of the invention.

Referring to FIG. 5, an exemplary hybrid vehicle embodiment of the invention is shown generally at 250. The hybrid vehicle 250 includes an engine 252 which is mechanically coupled through a transmission 254 and differential 256 to a pair of drive wheels 258 for driving the hybrid vehicle.

In this embodiment, a starter motor 260 is coupled to the engine 252 through a flywheel 261 as described above in connection with FIG. 1. The motor 260 is coupled to an energy bus 263 for receiving electrical energy for producing torque. The energy bus 263 is in turn coupled to an energy storage element 262, which may supply energy to the energy bus or receive energy from the energy bus to maintain a charge of the storage element. The motor 260 also includes a motor interface 264 for receiving control signals for controlling the motor and for producing signals representing motor operating conditions. For example, the motor interface 264 may include a current controller (not shown) that controls a current supplied to the motor from the energy bus 263 in response to receiving a current control signal.

The hybrid vehicle 250 also includes a controller 266 for controlling operation of the vehicle. In this embodiment the controller 266 is shown as a single integrated controller, but in some implementations controller functions may be distributed between a plurality of different controllers, which may be located in any of the engine 252, the motor 260, the energy storage element 262, and/or the transmission 254, for example.

The controller 266 includes an output 268 for producing motor control signals operable to request a torque $\tau_r$ and/or a speed $s_r$ of the motor, and an output 270 for producing an engine stop signal and/or an engine start signal. In this embodiment, the controller 266 includes an input 272 for receiving motor operating condition signals representing, for example, an actual torque being produced by the motor 260, an actual speed of the motor, and/or an angular position of the motor. In some embodiments, the motor may include a position sensor such as a Hall-effect sensor for generating the motor speed and/or position. Alternatively, since the torque coupled by the motor 260 is coupled to the engine 252, torque and speed signals may alternatively be produced at the engine and coupled to the input 172 of the controller 266.

The engine 252 includes an engine interface 271 for producing signals indicative of engine operating conditions, and the controller 266 includes inputs for receiving the engine operating condition signals produced by the engine interface. The engine interface 271 may comprise an Engine Control Unit (ECU) that controls various aspects of the operation of the engine 252. In this embodiment, the controller 266 includes an input 276 for receiving a position signal. The position signal may be produced by any of a variety of sensors which are located to sense motion of a moving part of the engine. For example a rotary shaft encoder may be located to sense movement of the flywheel 261 from which the piston positions can be derived. Alternatively a Hall-effect sensor may be located to sense movement of the crankshaft or the pistons or signals produced by or for the ignition system may be used to produce the position signals.

The controller 266 further includes an input 278 for receiving vehicle operating condition signals. In the embodiment shown, the hybrid vehicle 250 includes a vehicle velocity sensor 280 for producing a signal representing the velocity of the vehicle and an operator input device 282 having an output 284 for producing a demand signal. The operator input device 282 may include a foot pedal disposed in a driving compartment (not shown) of the hybrid vehicle 250, which is configured to produce the demand signal in response to an operator depressing the pedal, for example.

Optionally, the hybrid vehicle 250 may also include a traction motor 286 operable to produce mechanical power for driving the vehicle. The traction motor 286 includes an input 288 for receiving electrical energy from the energy bus 263, and is operable to convert the electrical energy into a torque, which is coupled to the drive wheels 258.

In other embodiments, the hybrid vehicle may include the traction motor 286, the engine 252, and the motor 260, as shown in FIG. 5, but without the coupling of the engine through the transmission 254 to the drive wheels 258. In such an embodiment (known as a serial hybrid vehicle) the engine and motor operate as a generator set for supplying electrical energy to the energy bus 263, and the traction motor 286 supplies the required drive power to the wheels 258.

Controller

Figure 6:
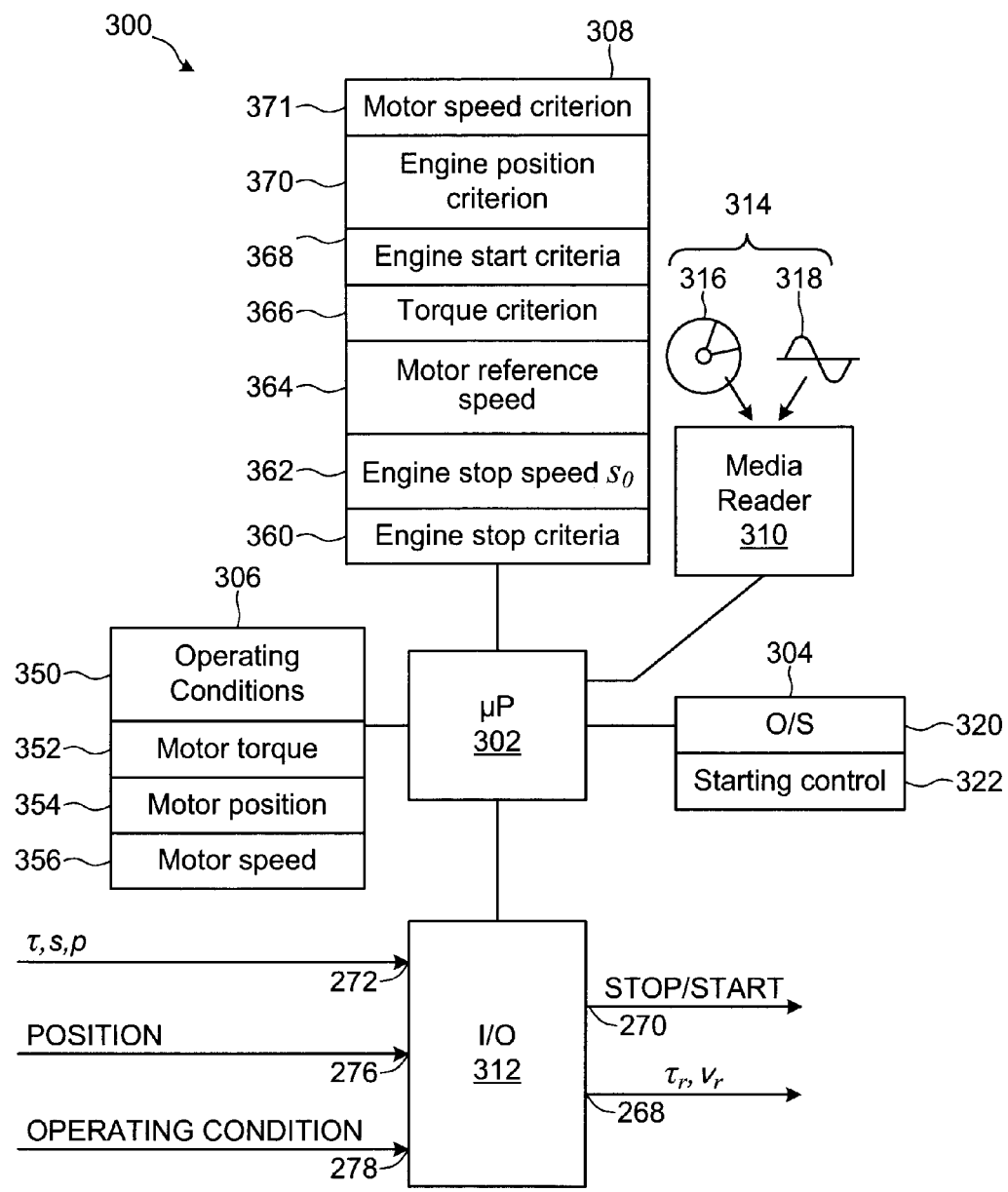
FIG. 6 is a schematic view of processor circuit for implementing a controller shown in FIG. 5.

Referring to FIG. 6, in one embodiment the controller 266 may be implemented using a processor circuit shown generally at 300. The processor circuit 300 includes a microprocessor 302, a program memory 304, a variable memory 306, a parameter memory 308, a media reader 310, and an input output port (I/O) 312, all of which are in communication with the microprocessor 302.

Program codes for directing the microprocessor 302 to carry out various functions are stored in the program memory 304, which may be implemented as a random access memory (RAM), as a read only memory (ROM) and/or a hard disk drive (HDD), or a combination thereof. The program memory includes a first block of program codes 320 for directing the microprocessor 302 to perform operating system functions and a second block of program codes 322 for directing the microprocessor 302 to control starting of the engine 252.

The media reader 310 facilitates loading program codes into the program memory 304 from a computer readable medium 314, such as a CD ROM disk 316, or a computer readable signal 318, such as may be received over a network such as a controller area network (CAN), which may be implemented in the vehicle 250, for example.

The I/O 312 includes the input 272 for receiving the motor operating condition signal (torque, speed), the input 276 for receiving the position signal, and the input 278 for receiving the vehicle operating condition signals. The I/O 312 also includes the output 268 for producing the motor control signals (torque and/or speed), and the output 270 for producing the engine stop/start signal.

The variable memory 306 includes a plurality of storage locations including a store 350 for storing operating condition signal values, a store 352 for storing motor torque values, a store 354 for storing motor position values, and a store 356 for storing motor speed values. The variable memory 306 may be implemented in random access memory, for example.

The parameter memory 308 includes a plurality of storage locations, including a store 360 for storing values representing engine stop criteria, a store 362 for storing an engine stopped speed $s_0$, a store 364 for storing a motor reference speed value, a store 366 for storing a torque criterion value, a store 368 for storing engine start criteria, a store 370 for storing an engine rotational position criterion, and a store 371 for storing motor speed criteria. The parameter memory 308 may be implemented in random access memory, for example.

In other embodiments (not shown), the controller 266 shown in FIG. 5 may be partly or fully implemented using a hardware logic circuit including discrete logic circuits and/or an application specific integrated circuit (ASIC).

Hybrid Vehicle Operation

Figure 7:
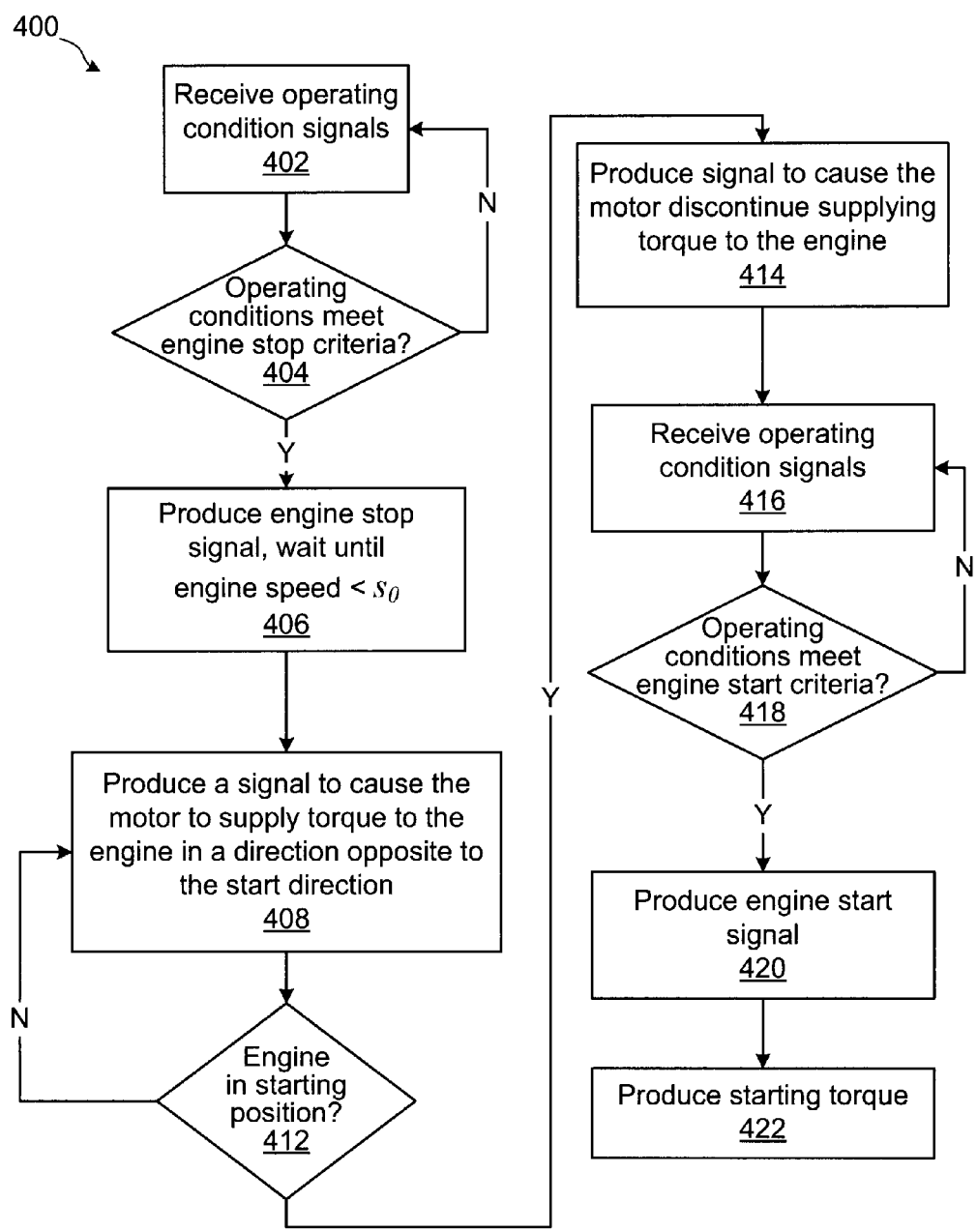
FIG. 7 is a flowchart including blocks of codes for directing the processor circuit shown in FIG. 6 to start an engine shown in FIG. 5 in accordance with an embodiment of the invention.

Referring to FIG. 7, a flowchart depicting blocks of code for directing the processor circuit 300 to operate the hybrid vehicle 250 is shown generally at 400. The process begins at block 402, which directs the microprocessor 302 to receive the operating condition signals at the input 278 of the I/O 312 and to store operating condition values in the store 350 of the variable memory 306.

Block 404 then directs the microprocessor 302 read the criteria for stopping the engine in the store 360 of the parameter memory 308, and to compare the operating condition signal values in the store 350 against the criteria. If the operating condition signal values do not meet the criteria for stopping the engine, then block 404 directs the microprocessor 302 back to block 402.

If at block 404 the operating condition signal values meet the criteria, then block 404 directs the microprocessor 302 to block 406. For example when the vehicle velocity sensor 280 produces a signal indicating that the hybrid vehicle 250 has stopped, and no operator input is received at the operator input device 282, then it is likely that the vehicle has at least temporarily halted (for example at a traffic signal), and the engine should be stopped.

Block 406 directs the microprocessor 302 to cause the I/O 312 to produce the engine stop signal at the output 270. The engine stop signal is received by the engine interface 271 and causes the engine to be stopped by interrupting engine ignition, for example. In general, the momentum of the moving components of the engine will cause the engine to run on for several engine cycles before coming to a standstill, and accordingly block 406 also directs the microprocessor 302 to read the engine stop speed parameter $s_0$ from the store 362 of the parameter memory 308, and to wait until the engine speed is less than $s_0$. In practice, $s_0$ may be a low engine speed such as 5 rpm, for example. Alternatively, the engine stopped condition may be inferred from an engine crankshaft position feedback signal, for example. As described above in connection with FIG. 3, the engine is likely to come to a standstill at one of the plurality of stop positions 166-172.

The process then continues at block 408, which directs the microprocessor 302 to produce a signal at the output 268 of the I/O to cause the motor 260 to supply torque to the engine 252 in a direction opposite to a direction required for starting the engine 252. The motor 260 thus causes the engine to be moved towards the starting position (such as the position 176 shown in FIG. 3).

Block 412 then directs the microprocessor 302 to determine whether the engine is in a starting position. If the engine is not in a starting position block 412 directs the microprocessor back to block 408. If the engine is in the starting position block 412 directs the microprocessor 302 to block 414. Blocks 408 and 412 are described in greater detail later herein.

Block 414 directs the microprocessor 302 to produce a signal at the output 268 that causes the motor to discontinue supplying torque to the engine (i.e. $s_r=0$). As described above, when the motor torque is discontinued, the cylinder compression acting on the pistons may cause the engine to move to a position 178, which becomes the new starting position.

The process 400 then continues at block 416 which directs the microprocessor 302 to again receive operating condition signals at the input 278 and to store the operating condition signal values in the store 350. Block 418 then directs the microprocessor 302 to read the engine start criteria from the store 368 of the parameter memory 308, and to compare the operating condition values in the store 350 against the start criteria. If the operating conditions do not meet the engine start criteria then block 418 directs the microprocessor 302 back to block 416.

If at block 418 the operating conditions meet the engine start criteria then the process continues at block 420. For example, in the hybrid vehicle 250, the engine start signal may be produced when the operator input device 282 receives user input of a demand for torque to be supplied to the drive wheels 258, and the vehicle velocity sensor 280 produces a signal indicating that the vehicle velocity has reached a velocity at which the engine should be started. Other vehicle operating conditions such as environmental or terrain indications may also be taken into account as engine start criteria.

The process then continues at block 420, which directs the microprocessor 302 to produce an engine start signal at the output 270. The engine 252 receives the start signal at the engine interface 271 and produces ignition signals for starting the engine. Block 422 then directs the microprocessor 302 to produce a starting torque signal at the output 268 of the I/O 312, which causes the motor 260 to produce the starting torque for starting the engine.

Advantageously, by configuring the engine 252 to the starting position the torque required for starting is minimized. Furthermore, in some hybrid vehicle embodiments when the vehicle is moving at the time the engine is started, torque spikes in the drive torque may be prevented or at least reduced.

Figure 8:
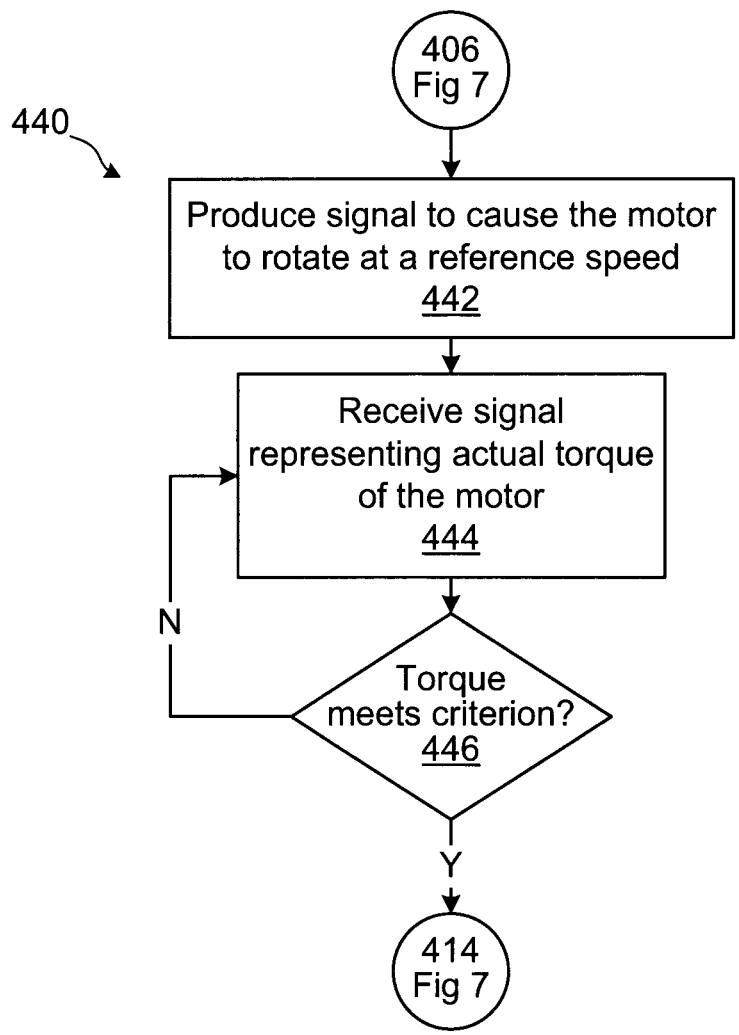
FIG. 8 is a flowchart including blocks of codes for directing the processor circuit shown in FIG. 6 to move the engine to a starting position in accordance with one embodiment of the invention.

Referring to FIG. 8, one possible embodiment of the process blocks 408 and 412 in the process 400 is shown generally at 440. The blocks in the process 440 replace blocks 408 and 412 shown in FIG. 7, while blocks 402-406, and 414-422 in FIG. 7 remain unchanged. Accordingly, after block 406 directs the microprocessor 302 to produce the engine stop signal, the process 440 begins at block 442.

Block 442 directs the microprocessor 302 to produce a control signal at the output 268, which requests the motor to rotate at the reference speed thus moving the moveable elements (pistons and crankshaft) in the engine 252.

Block 444 then directs the microprocessor 302 to receive the signal at the input 272 representing the actual torque produced by the motor 260 to maintain the reference speed. Block 444 also directs the microprocessor 302 to store the actual torque value in the store 352 of the variable memory 306. The actual torque produced by the motor 260 is generally indicative of the compression condition produced by the pistons within the respective cylinders.

Block 446 then directs the microprocessor 302 to read the torque criterion from the store 366 of the parameter memory 308 and to compare the actual torque value in the store 352 with the torque criterion. If the actual torque is less then the torque criterion then the torque criterion is not met and block 446 directs the microprocessor 302 back to block 444. If the actual torque is greater than or equal to the torque criterion for a first period of time then the torque criterion is met and block 446 directs the microprocessor 302 to block 414 in FIG. 7. In practice, the first period of time is generally selected to cause spurious torque signals that momentarily exceed torque criterion to be disregarded. For example, the first time period may be about 1 second.

Figure 9:
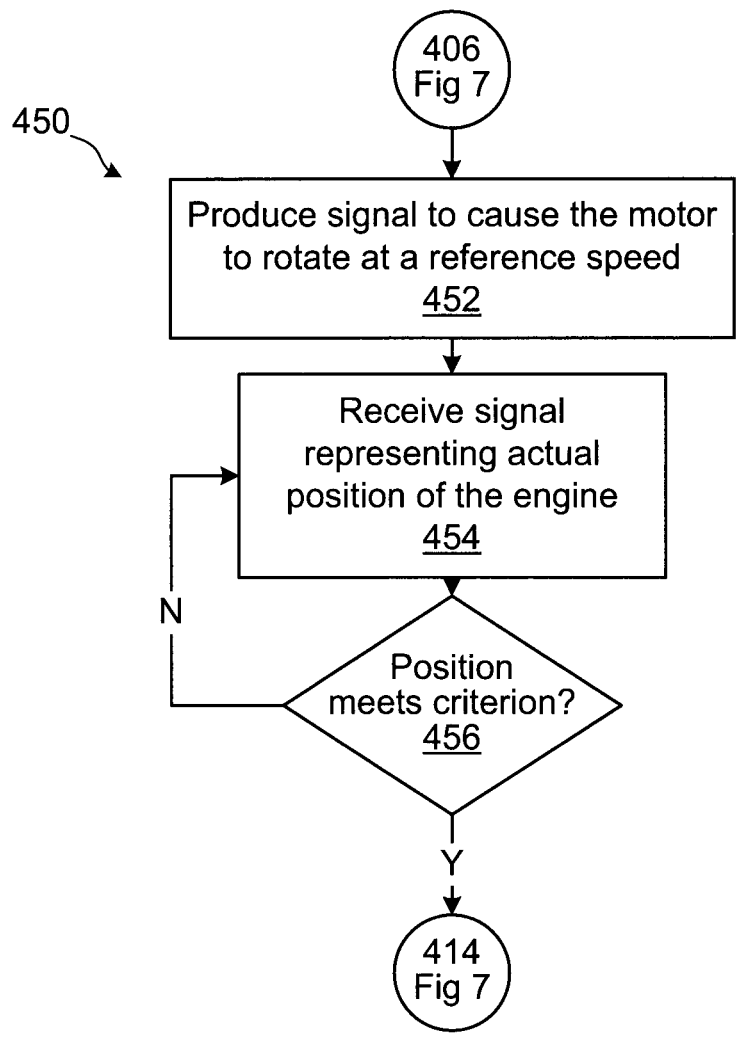
FIG. 9 is a flowchart including blocks of codes for directing the processor circuit shown in FIG. 6 to move the engine to a starting position in accordance with another embodiment of the invention.

Referring to FIG. 9, another possible embodiment of the process blocks 408 and 412 in the process 400 is shown generally at 450. The blocks in the process 450 replace blocks 408 and 412 shown in FIG. 7, while blocks 402-406, and 414-422 in FIG. 7 remain unchanged. Accordingly, after block 406 directs the microprocessor 302 to produce the engine stop signal, the process 450 begins at block 452.

Block 452 directs the microprocessor 302 to produce a motor control signal at the output 268, which requests the motor to rotate at a reference speed.

Block 454 then directs the microprocessor 302 to receive the position signal at the input 276 of the I/O 312 and to store the position signal value in the store 354 of the variable memory 306. Alternatively, in other embodiments, the position signal could be a motor position signal received at the input 272 of the I/O, and from which the engine rotational position can be inferred.

Block 456 then directs the microprocessor 302 to read the engine rotational position criterion from the store 370 of the parameter memory 308 and to compare the actual engine rotational position against the criterion. If the position does not meet the position criterion then block 456 directs the microprocessor 302 back to block 454. If at block 456, the engine rotational position meets the position criterion then block 456 directs the microprocessor 302 to block 414 in FIG. 7.

Figure 10:
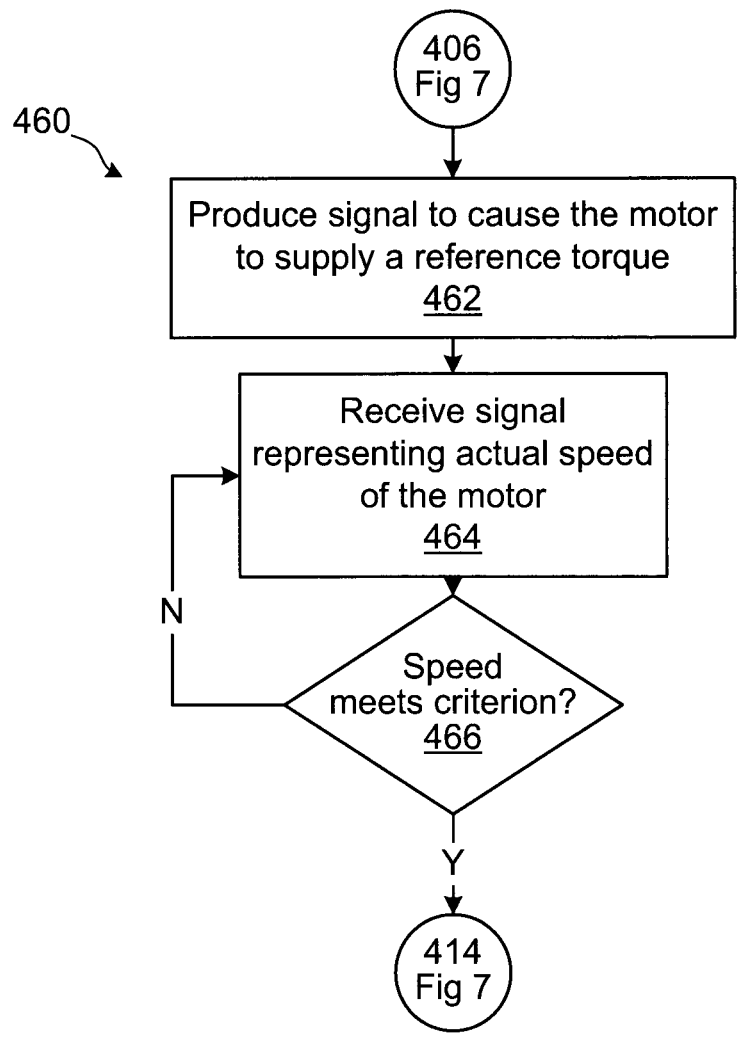
FIG. 10 is a flowchart including blocks of codes for directing the processor circuit shown in FIG. 6 to move the engine to a starting position in accordance with yet another embodiment of the invention.

Referring to FIG. 10, another possible embodiment of the process blocks 408 and 412 in the process 400 is shown generally at 460. The blocks in the process 460 replace blocks 408 and 412 shown in FIG. 7, while blocks 402-406, and 414-422 in FIG. 7 remain unchanged. Accordingly, after block 406 directs the microprocessor 302 to produce the engine stop signal, the process 460 begins at block 462.

Block 462 directs the microprocessor 302 to produce a control signal at the output 268, which requests the motor to supply a reference torque to the engine.

Block 464 then directs the microprocessor 302 to receive the actual motor speed signal at the input 272 of the I/O 312 and to store the speed signal value in the store 356 of the variable memory 306. Alternatively, in other embodiments, the speed signal could be received from an engine speed sensor (not shown).

Block 466 then directs the microprocessor 302 to read the motor speed criterion from the store 371 of the parameter memory 308 and to compare the actual motor speed against the criterion. If the motor speed does not meet the speed criterion, then block 466 directs the microprocessor 302 back to block 474. If at block 466, the motor speed meets the speed criterion then block 476 directs the microprocessor 302 to block 414 in FIG. 7. For example, the motor speed criterion may require that the speed reduce below a minimum, which indicates that the reference torque is being countered by the compression of the cylinder.

Figure 11:
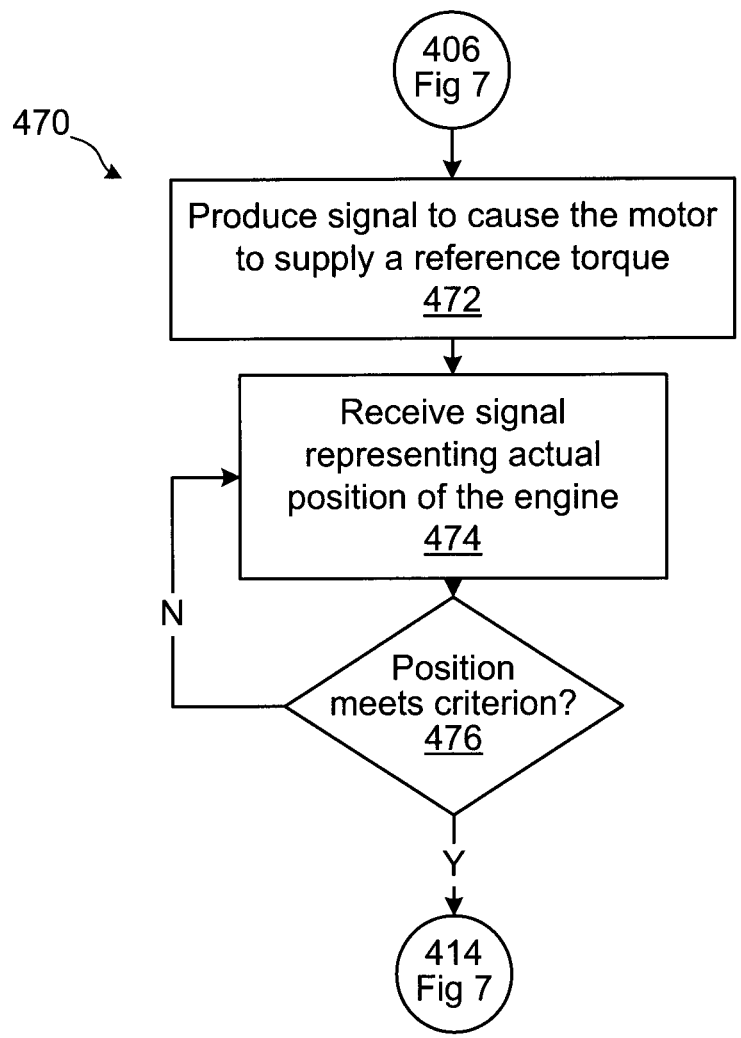
FIG. 11 is a flowchart including blocks of codes for directing the processor circuit shown in FIG. 6 to move the engine to a starting position in accordance with yet another embodiment of the invention.

Referring to FIG. 11, another possible embodiment of the process blocks 408 and 412 in the process 400 is shown generally at 470. The blocks in the process 450 replace blocks 408 and 412 shown in FIG. 7, while blocks 402-406, and 414-422 in FIG. 7 remain unchanged. Accordingly, after block 406 directs the microprocessor 302 to produce the engine stop signal, the process 470 begins at block 472.

Block 472 directs the microprocessor 302 to produce a control signal at the output 268, which requests the motor to supply a reference torque to the engine.

Block 474 then directs the microprocessor 302 to receive the position signal at the input 276 of the I/O 312 and to store the position signal value in the store 354 of the variable memory 306. Alternatively, in other embodiments, the position signal could be a motor position signal received at the input 272 of the I/O, and from which the engine rotational position can be inferred.

Block 476 then directs the microprocessor 302 to read the engine rotational position criterion from the store 370 of the parameter memory 308 and to compare the actual engine rotational position against the criterion. If the position does not meet the criterion then block 476 directs the microprocessor 302 back to block 474. If at block 456, the engine rotational position meets the criterion then block 476 directs the microprocessor 302 to block 414 in FIG. 7.

Integrated starter generator embodiment

Referring back to FIG. 5, in embodiments in which the optional traction motor 286 is not included, the motor 260 may perform functions of starting the engine and generating electrical energy for charging the storage element 262. When generating electrical energy, the motor 260 receives mechanical power from the engine 252 and produces electrical energy, which is coupled onto the energy bus 263. The energy coupled onto the energy bus 263 may be used for driving the hybrid vehicle 250, charging the storage element 262, and/or powering vehicle accessories (not shown). In this embodiment the ISG may be permanently coupled to the engine, and selectively configured between a starter motor mode and a generator mode. Alternatively, the ISG may be selectively decoupled from the engine when there is no requirement for charging of the storage element, thus reducing parasitic loads on the engine.

In other embodiments that omit the traction motor 286, the motor 260 may also be configured to provide drive power to the wheels 258 by coupling torque through the engine crankshaft to the transmission 254. The drive power supplied by the motor 260 may be additive to power produced by the engine or may applied when the engine is not started.

Advantageously, the methods and apparatus described above facilitate a reduction of the peak starting torque required for starting an engine. Reduction of peak starting torque allows a smaller and less costly starter motor to be used. Alternatively, the reduction of starting torque may facilitate selection of a motor that is better suited for other functions that the motor is required to provide, such as generating drive power of the vehicle and/or generating electrical energy.

While specific embodiments of the invention have been described and illustrated, such embodiments should be considered illustrative of the invention only and not as limiting the invention as construed in accordance with the accompanying claims.

What is claimed is:

1. A method for starting an internal combustion engine having a motor mechanically coupled to the engine, the engine having at least one moveable element mounted in a chamber, the moveable element being operable to cause a changing compression condition within the chamber as the moveable element moves from a low compression condition through a compression stroke to a peak compression condition, the engine being mechanically coupled to a shaft for generating mechanical power, the method comprising:
   calculating a reference positioning torque;
   causing the motor to supply the reference positioning torque to the engine to move the at least one moveable element in a direction opposite to a direction of the compression stroke into a starting position where the positioning torque is opposed by a compression condition due to a firing stroke of the engine; and
   causing the motor to supply a starting torque to the engine.

2. The method of claim 1 wherein causing the motor to supply said reference positioning torque to move the at least one moveable element into said starting position comprises causing the motor to supply the reference positioning torque to the engine in an opposite direction to said starting torque, said reference positioning torque having a magnitude sufficient to cause the at least one moveable element to move to a position at which a force exerted on the moveable element by said reference torque matches a force exerted on the moveable element due to the compression condition in the chamber.

3. The method of claim 2 wherein causing the motor to supply said reference positioning torque comprises calculating said magnitude of said reference positioning torque in response to receiving a temperature signal representing an operating temperature of the engine.

4. The method of claim 1 wherein causing the motor to supply said reference positioning torque to move the at least one moveable element into said starting position comprises:
   causing the motor to supply torque to the engine to cause the moveable element to move in a direction opposite to a direction required to start the engine; and
   causing the motor to discontinue supplying torque to the engine when said moveable element reaches said starting position.

5. The method of claim 4 wherein causing the motor to supply said reference positioning torque to the engine comprises causing the moveable element to move at a reference speed toward said starting position.

6. The method of claim 5 wherein causing the motor to discontinue supplying torque to the engine when said moveable element reaches said starting position comprises:
   receiving a signal representing one of:
      a magnitude of said torque supplied by the motor to maintain said reference speed; or
      a position of the at least one moveable element in the chamber; and
   causing the motor to discontinue supplying torque to the engine when said signal meets a criterion.

7. The method of claim 4 wherein causing the motor to supply said reference positioning torque to the engine comprises causing the motor to supply the reference positioning torque to the engine to cause the moveable element to move toward said starting position.

8. The method of claim 7 wherein causing the motor to discontinue supplying torque to the engine when said moveable element reaches said starting position comprises:
   receiving a signal representing one of:
      a position of the at least one moveable element in the chamber; or
      a speed of said moveable element; and
   causing the motor to discontinue supplying torque to the engine when said signal meets a criterion.

9. The method of claim 1 wherein the at least one moveable element comprises a piston received in a cylindrical chamber for reciprocating linear motion therein, the piston being mechanically coupled to a crankshaft for converting the reciprocating linear motion into rotary motion of the crankshaft and further comprising mechanically coupling the motor to the crankshaft to supply said reference positioning torque and said starting torque to said piston.

10. The method of claim 1 wherein said at least one moveable element comprises a plurality of pistons, each being received in a respective cylindrical chamber and coupled to a crankshaft such that, in operation, at least two of the plurality of pistons have peak compression conditions that occur spaced apart in time, and wherein causing the motor to supply said reference positioning torque to the engine comprises supplying a torque to the crankshaft to cause the plurality of pistons to move to one of at least two starting positions having a low compression condition.

11. The method of claim 1 wherein causing the motor to supply said reference positioning torque comprises causing the motor to supply the reference positioning torque to the engine in response to receiving an engine control signal having a signal state indicating that the engine has been stopped.

12. The method of claim 1 wherein causing the motor to supply said reference positioning torque comprises producing a motor control signal operable to cause an electrical current to be coupled to the motor to produce said reference positioning torque.

13. The method of claim 1 further comprising causing the motor to be configured in a generator mode once the engine has been started, the motor being operable to produce electrical energy in response to receiving a torque from the engine when configured in said generator mode.

14. The method of claim 1 further comprising decoupling the motor from the engine after the engine has been started.

15. The method of claim 14 wherein causing the motor to supply the reference positioning torque to the engine comprises mechanically coupling the motor to the engine when the engine is stopped.

16. The method of claim 1 wherein the engine comprises more than one moveable element and wherein causing the motor to supply said reference positioning torque comprises causing the motor to supply the reference positioning torque to the engine to move the at least one moveable element in a direction away from the compression stroke into a starting position where the positioning torque is opposed by a compression condition due to a firing stroke of another moveable element of the engine.

17. An apparatus for starting an internal combustion engine, the apparatus comprising:
   an electric motor mechanically coupled to the engine, the engine having at least one moveable element mounted in a chamber, the moveable element being operable to move to cause a changing compression condition within the chamber as the moveable element moves from a low compression condition through a compression stroke to a peak compression condition, the engine being mechanically coupled to a shaft for generating mechanical power;
   a controller, operably configured to:
      calculate a reference positioning torque;
      cause the motor to supply the reference positioning torque to the engine to move the at least one moveable element in a direction opposite to a direction of the compression stroke into a starting position where the positioning torque is opposed by a compression condition due to a firing stroke of the engine; and cause the motor to supply a starting torque to the engine when4he engine.

18. The apparatus of claim 17 wherein said controller is operably configured to cause the motor to supply the reference positioning torque to the engine in an opposite direction to said starting torque, said reference positioning torque having a magnitude sufficient to cause the at least one moveable element to move to a position at which a force exerted on the moveable element by said reference torque matches a force exerted on the moveable element due to the compression condition in the chamber.

19. The apparatus of claim 18 wherein said controller is operably configured to calculate said magnitude of said reference positioning torque in response to receiving a temperature signal representing an operating temperature of the engine.

20. The apparatus of claim 17 wherein said controller is operably configured to:

cause the motor to supply torque to the engine to cause the moveable element to move in a direction opposite to a direction required to start the engine; and cause the motor to discontinue supplying torque to the engine when said moveable element reaches said starting position.

21. The apparatus of claim 17 wherein said controller is operably configured to cause the motor to supply said reference positioning torque by causing the moveable element to move at a reference speed toward said starting position.

22. The apparatus of claim 21 wherein said controller is operably configured to:

receive a signal representing one of:
 a magnitude of said torque supplied by the motor to maintain said reference speed; or
 a position of the at least one moveable element in the chamber; and cause the motor to discontinue supplying torque to the engine when said signal meets a criterion.

23. The apparatus of claim 17 wherein said controller is operably configured to cause the motor to supply said reference positioning torque by causing the motor to supply a reference torque to the engine to cause the moveable element to move toward said starting position.

24. The apparatus of claim 23 wherein said controller is operably configured to:

receive a signal representing one of:
 a position of the at least one moveable element in the chamber; or
 a speed of said moveable element; and cause the motor to discontinue supplying torque to the engine when said signal meets a criterion.

25. The apparatus of claim 17 wherein the at least one moveable element comprises a piston received in a cylindrical chamber for reciprocating linear motion therein, the piston being mechanically coupled to a crankshaft for converting the reciprocating linear motion into rotary motion of the crankshaft and wherein the motor is operably configured to be coupled to the crankshaft to supply said reference positioning torque and said starting torque to said piston.

26. The apparatus of claim 17 wherein said at least one moveable element comprises a plurality of pistons, each being received in a respective cylindrical chamber and coupled to a crankshaft such that, in operation, at least two of the plurality of pistons have peak compression conditions that occur spaced apart in time, and wherein said controller is operably configured to cause the motor to supply said reference positioning torque to the engine by supplying a torque to the crankshaft to cause the plurality of pistons to move to one of at least two starting positions having a low compression condition.

27. The apparatus of claim 17 wherein said controller is operably configured to cause the motor to supply said reference positioning torque to the engine in response to receiving an engine control signal having a signal state indicating that the engine has been stopped.

28. The apparatus of claim 17 wherein the engine is operably configured to couple the mechanical power produced by the engine to at least one drive wheel of a vehicle and wherein said controller is operably configured to produce a motor control signal operable to cause an electrical current to be coupled to the motor to produce said reference positioning torque.

29. The apparatus of claim 17 wherein the motor is operable to be configured in a generator mode once the engine has been started, the motor being operable to produce electrical energy in response to receiving a torque from the engine when configured in said generator mode.

30. The apparatus of claim 17 wherein the motor is operably configured to decouple from the engine after the engine has been started.

31. The apparatus of claim 30 wherein the motor is operably configured supply the reference positioning torque to the engine by mechanically coupling the motor to the engine when the engine is stopped.

32. The apparatus of claim 17 wherein the engine comprises more than one moveable element and wherein the controller is operably configured to cause the motor to supply said reference positioning torque by causing the motor to supply a positioning torque to the engine to move the at least one moveable element in a direction away from the compression stroke into a starting position where the positioning torque is opposed by a compression condition due to a firing stroke of another moveable element of the engine.

33. An apparatus for starting an internal combustion engine having an electric motor mechanically coupled to the engine, the engine having at least one moveable element mounted in a chamber, the moveable element being operable to cause a changing compression condition within the chamber as the moveable element moves from a low compression condition through a compression stroke to a peak compression condition, the engine being mechanically coupled to a shaft for generating mechanical power, the apparatus comprising:

means for calculating a reference positioning torque;

means for causing the motor to supply the reference positioning torque to the engine to move the at least one moveable element in a direction opposite to a direction of the compression stroke into a starting position where the positioning torque is opposed by a compression condition due to a firing stroke of the engine; and means for causing the motor to supply a starting torque to the engine.

34. The apparatus of claim 33 wherein the engine comprises more than one moveable element and wherein said means for causing the motor to supply said reference positioning torque comprises means for causing the motor to supply a positioning torque to the engine to move the at least one moveable element in a direction away from the compression stroke into a starting position where the positioning torque is opposed by a compression condition due to a firing stroke of another moveable element of the engine.

35. A computer readable medium encoded with codes for directing a processor circuit to start an internal combustion engine, the internal combustion engine having an electric motor mechanically coupled to the engine, the engine having at least one moveable element mounted in a chamber, the moveable element being operable to cause a changing compression condition within the chamber as the moveable element moves from a low compression condition through a compression stroke to a peak compression condition, the engine being mechanically coupled to a shaft for generating mechanical power, the codes directing the processor circuit to:

calculate a reference positioning torque;

cause the motor to supply the reference positioning torque to the engine to move the at least one moveable element in a direction opposite to a direction of the compression stroke into a starting position where the positioning torque is opposed by a compression condition due to a firing stroke of the engine; and cause the motor to supply a starting torque to the engine.

\* \* \* \* \*

UNITED STATES PATENT AND TRADEMARK OFFICE
CERTIFICATE OF CORRECTION

PATENT NO. : 8,474,429 B2
APPLICATION NO. : 12/735049
DATED : July 2, 2013
INVENTOR(S) : Bouchon et al.

It is certified that error appears in the above-identified patent and that said Letters Patent is hereby corrected as shown below:

In the Claims:

The exact column and line numbers where the error occurred is in the issued patent at:
column 19, lines 4-5: "cause the motor to supply a starting torque to the engine when4he engine."
should read --cause the motor to supply a starting torque to the engine.--

Signed and Sealed this
Seventeenth Day of September, 2013

Teresa Stanek Rea
*Deputy Director of the United States Patent and Trademark Office*